United States Patent

Momose

(10) Patent No.: US 10,094,697 B2
(45) Date of Patent: Oct. 9, 2018

(54) STANDARD SIGNAL GENERATOR

(71) Applicant: AZBIL CORPORATION, Chiyoda-ku (JP)

(72) Inventor: Osamu Momose, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 258 days.

(21) Appl. No.: 15/215,713

(22) Filed: Jul. 21, 2016

(65) Prior Publication Data

US 2017/0023396 A1 Jan. 26, 2017

(30) Foreign Application Priority Data

Jul. 22, 2015 (JP) ................................. 2015-144644

(51) Int. Cl.
  *G01F 25/00* (2006.01)
  *G01F 1/60* (2006.01)
(52) U.S. Cl.
  CPC ............ *G01F 25/0007* (2013.01); *G01F 1/60* (2013.01)
(58) Field of Classification Search
  CPC ............................... G01F 1/60; G01F 25/0007
  USPC .................................................. 73/1.16, 1.34
  See application file for complete search history.

(56) References Cited

U.S. PATENT DOCUMENTS

| | | | | |
|---|---|---|---|---|
| 5,576,486 A | * | 11/1996 | Paz | ........................ F16K 31/084 |
| | | | | 137/519.5 |
| 2006/0006354 A1 | * | 1/2006 | Guler | ...................... E03C 1/057 |
| | | | | 251/129.04 |
| 2016/0116325 A1 | * | 4/2016 | Momose | ............. G01F 25/0007 |
| | | | | 73/1.16 |

FOREIGN PATENT DOCUMENTS

| | | |
|---|---|---|
| JP | 6-43521 | 2/1994 |
| JP | 6-69743 | 3/1994 |
| JP | 7-146165 | 6/1995 |

* cited by examiner

*Primary Examiner* — Benjamin Schmitt
(74) *Attorney, Agent, or Firm* — Oblon, McClelland, Maier & Neustadt, L.L.P.

(57) ABSTRACT

An input circuit includes a rectifier circuit that rectifies an excitation current obtained from a converter, and a constant voltage circuit that receives output of the rectifier circuit and performs control so that a power supply voltage is maintained constant. A power supply voltage source switching unit switches the source of a power supply voltage used in a calibrator to the constant voltage circuit when the converter is a converter of a four-wire electromagnetic flowmeter, and switches the source of the power supply voltage to a battery when the converter is a converter of a two-wire electromagnetic flowmeter. A remaining capacity indicator provides a remaining battery capacity indication in accordance with the voltage of the battery. When the converter is a converter of a four-wire electromagnetic flowmeter and it is determined that the battery is not in a battery holder, the remaining capacity indicator stops providing a remaining battery capacity.

4 Claims, 8 Drawing Sheets

FIG. 6E  (INDICATION TURNED OFF)

STANDARD SIGNAL GENERATOR

CROSS-REFERENCE TO RELATED APPLICATIONS

The present application claims priority to Japanese Application No. 2015-144644, filed Jul. 22, 2015, the entire contents of which are incorporated herein by reference.

BACKGROUND OF THE INVENTION

1. Field of the Invention

The present invention relates to a standard signal generator for calibrating a converter of an electromagnetic flowmeter.

2. Description of the Related Art

Figure 7A:
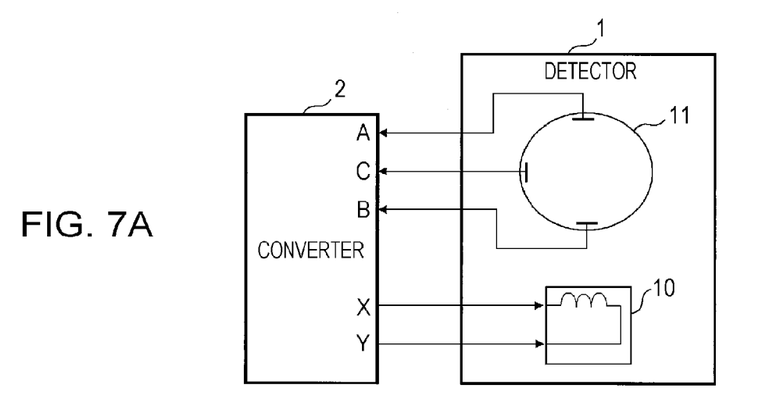
FIG. 7A is a block diagram illustrating the configuration of an electromagnetic flowmeter of the related art.
Figure 7B:
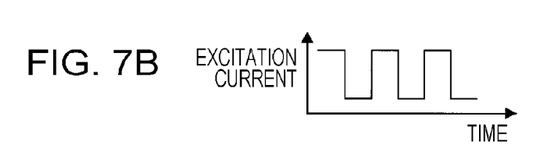
FIGS. 7B and 7C are diagrams illustrating signal waveforms for components of the electromagnetic flowmeter.
Figure 7C:
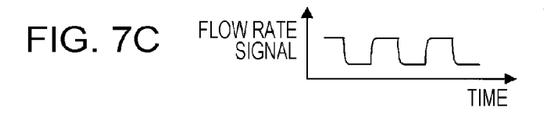

FIG. 7A is a block diagram illustrating the configuration of an electromagnetic flowmeter of the related art. The electromagnetic flowmeter includes a detector 1 and a converter 2. The detector 1 includes an excitation coil 10 that generates a magnetic field, and a measurement tube 11 adapted for placement in the magnetic field generated from the excitation coil 10, for detecting an electromotive force produced by a fluid under measurement flowing through the magnetic field and outputting a flow rate signal that is proportional to the flow velocity of the fluid. The converter 2 supplies an excitation current such as that illustrated in FIG. 7B to the excitation coil 10 of the detector 1, and converts the flow rate signal input from the detector 1, such as that illustrated in FIG. 7C, into an analog signal or a digital signal indicating the flow rate or flow velocity of the fluid.

The flow rate signal input from the detector 1 to the converter 2 is a minute signal on the order of microvolts (µV), which may lead to deterioration in measurement accuracy due to aging of electrical components used in the converter 2. To address the deterioration, the electromagnetic flowmeter is subjected to periodic calibration in the following way with the use of a standard signal generator (hereinafter referred to as a "calibrator") at the site where the electromagnetic flowmeter is installed (see Japanese Unexamined Utility Model Registration Application Publication No. 6-43521, Japanese Unexamined Utility Model Registration Application Publication No. 6-69743, and Japanese Unexamined Patent Application Publication No. 7-146165).

Figures 8A, 8B:
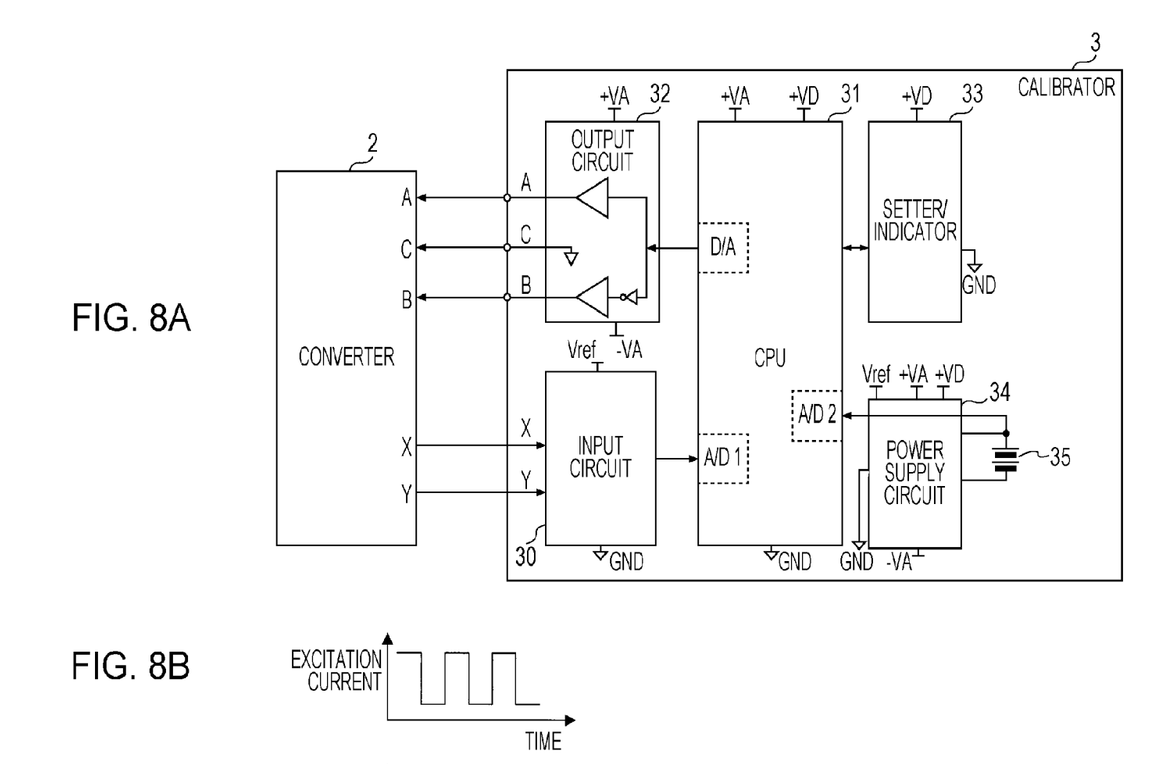
FIG. 8A is a block diagram illustrating the configuration of a calibrator of the related art.
FIGS. 8B and 8C are diagrams illustrating signal waveforms for components of the calibrator.

In the calibration operation, first, in place of the detector 1, a calibrator 3 having a configuration illustrated in FIG. 8A is connected to the converter 2. The calibrator 3 includes an input circuit 30 that receives an excitation current input from the converter 2, such as that illustrated in FIG. 8B, a central processing unit (CPU) 31 that generates a reference flow rate signal, an output circuit 32 that outputs the reference flow rate signal generated by the CPU 31, a setter/indicator 33 used for the setting of the calibrator 3 and the visual indication of information to a calibration operator, a power supply circuit 34, and a battery 35. The calibration operator sets, in the calibrator 3, information on the type of the converter 2 and a flow velocity value at a calibration point by using the setter/indicator 33.

Figure 8C:
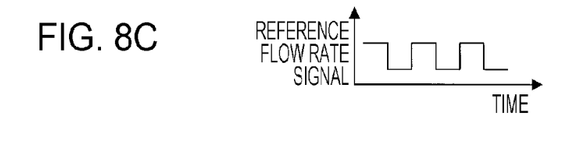

The CPU 31 of the calibrator 3 outputs a reference flow rate signal corresponding to the set flow velocity value in synchronization with excitation currents input from X and Y terminals of the converter 2 via the input circuit 30. The reference flow rate signal is input to the converter 2 via the output circuit 32 as a signal illustrated in FIG. 8C. The calibration operator checks data output from the converter 2 in accordance with the reference flow rate signal to determine whether the degree of measurement accuracy of the converter 2 is tolerable. The converter 2 is re-adjusted, if necessary, in accordance with the check result.

In the calibration operation with the use of the calibrator 3 described above, a commercial power supply may not be available at the site where the electromagnetic flowmeter is installed. To perform a calibration operation even at such a site, the battery 35 is used as a power supply for the calibrator 3 and voltages necessary for the components of the calibrator 3 are generated by using the power supply circuit 34. The voltage of the battery 35 is fed into an analog-to-digital (A/D) converter of the CPU 31 and the setter/indicator 33 provides a visual indication in accordance with the remaining capacity of the battery 35 (FIGS. 9A to 9D).

Figure 9A:
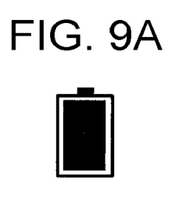
FIGS. 9A to 9D are diagrams illustrating example remaining battery capacity indications for the calibrator of the related art.
Figure 9B:
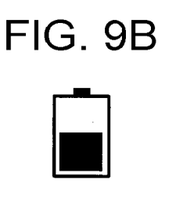
Figure 9C:
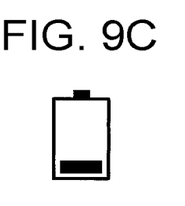
Figure 9D:
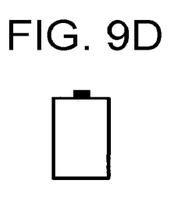

In an example illustrated in FIGS. 9A to 9D, the remaining capacity indication is provided using four stages: a remaining battery capacity of 80 to 100% (FIG. 9A), a remaining battery capacity of 30 to 79% (FIG. 9B), a remaining battery capacity of 10 to 29% (FIG. 9C), and a remaining battery capacity of less than 10% (FIG. 9D). The operation is interrupted if the battery 35 runs down during the operation. Thus, when the battery voltage decreases to around a level at which the calibrator 3 fails to operate normally (in the example illustrated in FIG. 9D, at a remaining capacity of less than 10%), the remaining capacity indication is caused to flash at intervals of, for example, one second (to indicate a remaining battery capacity alarm) to advise replacement of the battery 35.

A traditional calibrator uses a battery as a power supply and once the battery is depleted at the site, the calibration operation is difficult to perform. To address this difficulty, a method is available for generating a power supply voltage for a calibrator by utilizing an excitation current supplied from a converter. It should be noted that, in a two-wire electromagnetic flowmeter, an excitation current supplied from a converter is so small (less than or equal to approximately 25 mA) as to be used as a power supply of a calibrator. In a two-wire electromagnetic flowmeter, therefore, a battery is also used as the power supply to allow the calibrator to be driven by battery when the converter connected to the calibrator is a converter of a two-wire electromagnetic flowmeter.

In a case where both a power supply voltage generated from an excitation current and a power supply voltage supplied from a battery are available as power supply voltages for a calibrator, the calibrator can operate without a battery if the converter connected thereto is a converter of a four-wire electromagnetic flowmeter since the excitation current supplied from the converter is sufficiently large. However, without a battery, a remaining battery capacity alarm such as that described above is activated, which results in a user who uses only a four-wire electromagnetic flowmeter being unnecessarily bothered.

SUMMARY

Accordingly, it is an object of the present invention to provide a standard signal generator that operates in accordance with the type of the converter connected thereto by automatically switching between a power supply voltage generated from an excitation current and a power supply voltage supplied from a battery, in which a remaining battery capacity alarm unnecessary for a user who uses only a four-wire electromagnetic flowmeter is disabled.

An aspect of the present invention provides a standard signal generator for generating a reference flow rate signal for calibrating an electromagnetic flowmeter. The standard signal generator includes an input circuit that receives an excitation current obtained from a converter in the electromagnetic flowmeter, a battery holder that holds a battery, a power supply voltage source switching unit that switches a source of a power supply voltage to be used in the standard signal generator, and a remaining capacity indicator that provides a remaining battery capacity indication. The input circuit includes a rectifier circuit that rectifies the excitation current obtained from the converter, and a constant voltage circuit that receives as input an output voltage of the rectifier circuit and controls a power supply voltage output from a power supply voltage output terminal of the input circuit so that the power supply voltage is maintained constant. The power supply voltage source switching unit switches the source of the power supply voltage to be used in the standard signal generator to the constant voltage circuit when the converter, which is connected to the standard signal generator, is a converter of a four-wire electromagnetic flowmeter, and switches the source of the power supply voltage to be used in the standard signal generator to a battery placed in the battery holder when the converter, which is connected to the standard signal generator, is a converter of a two-wire electromagnetic flowmeter. The remaining capacity indicator measures a voltage of the battery across electrodes of the battery holder, and provides a remaining battery capacity indication based on a measurement result obtained by measuring the voltage of the battery. When the converter, which is connected to the standard signal generator, is a converter of a four-wire electromagnetic flowmeter and it is determined, based on the measurement result, that the battery is not in the battery holder, the remaining capacity indicator stops providing a remaining battery capacity indication.

When the converter, which is connected to the standard signal generator, is a converter of a four-wire electromagnetic flowmeter or a two-wire electromagnetic flowmeter and it is determined, based on the measurement result, that the battery placed in the battery holder has a remaining capacity less than a specified value, the remaining capacity indicator may give a remaining battery capacity alarm.

The input circuit may further include a current value measurement input circuit that outputs a current-value-measurement voltage for measurement of a current value, the current-value-measurement voltage being proportional to a magnitude of the excitation current obtained from the converter. The power supply voltage source switching unit and the remaining capacity indicator may be configured to determine, based on the current-value-measurement voltage, whether the converter, which is connected to the standard signal generator, is a converter of a four-wire electromagnetic flowmeter or a converter of a two-wire electromagnetic flowmeter.

The standard signal generator may further include a controller that generates a reference flow rate signal synchronized with the excitation current obtained from the converter and outputs the reference flow rate signal to the converter.

According to an aspect of the present invention, no remaining battery capacity indication is given when a converter connected to a standard signal generator is a converter of a four-wire electromagnetic flowmeter and it is determined, based on a measurement result, that no battery is in a battery holder. This configuration allows no remaining battery capacity alarm to be given to a user who uses only a four-wire electromagnetic flowmeter, which results in the user being unnecessarily bothered.

DESCRIPTION OF THE PREFERRED EMBODIMENTS

Figure 1:
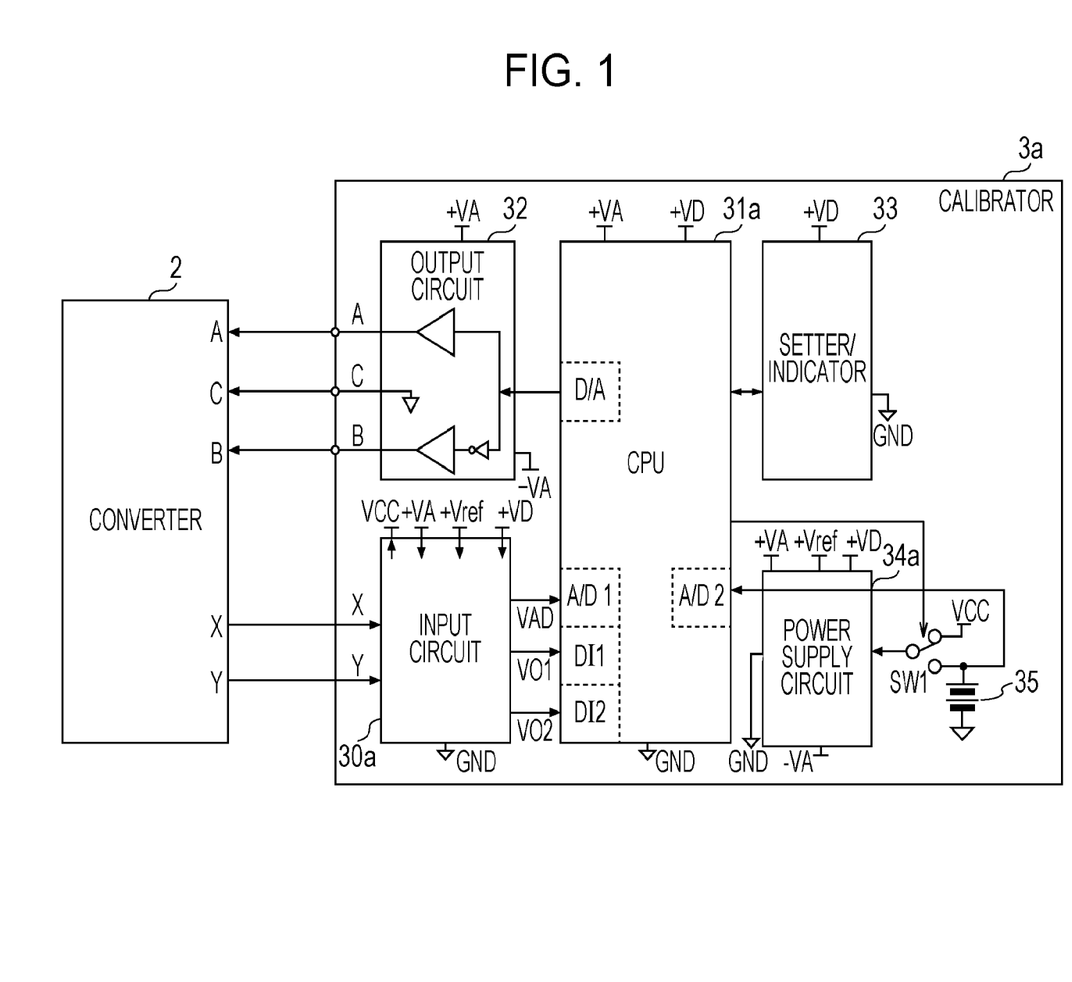
FIG. 1 is a block diagram illustrating the configuration of a calibrator according to an embodiment of the present invention.

An embodiment of the present invention will be described hereinafter with reference to the drawings. FIG. 1 is a block diagram illustrating the configuration of a calibrator according to an embodiment of the present invention, and components having substantially the same configuration as those in FIG. 8A are assigned the same reference numerals. A calibrator 3a according to this embodiment includes an input circuit 30a that receives an excitation current input from a converter 2, a CPU 31a serving as a controller that generates a reference flow rate signal synchronized with the excitation current, an output circuit 32 that converts the reference flow rate signal output from the CPU 31a into a differential signal and outputs the differential signal to the converter 2, a setter/indicator 33 used for the setting of the calibrator 3a and the visual indication of information to a calibration operator, a power supply circuit 34a, a battery 35, and a switch SW1.

The battery 35 is placed in a battery holder (not illustrated) within the housing of the calibrator 3a. The battery 35 may be a primary battery or a secondary battery.

The CPU 31a and the switch SW1 constitute a power supply voltage source switching unit configured to switch the source of the power supply voltage to be used by the calibrator 3a. The CPU 31a and the setter/indicator 33 constitute a remaining capacity indicator that provides the indication of the remaining battery capacity.

Figure 2:
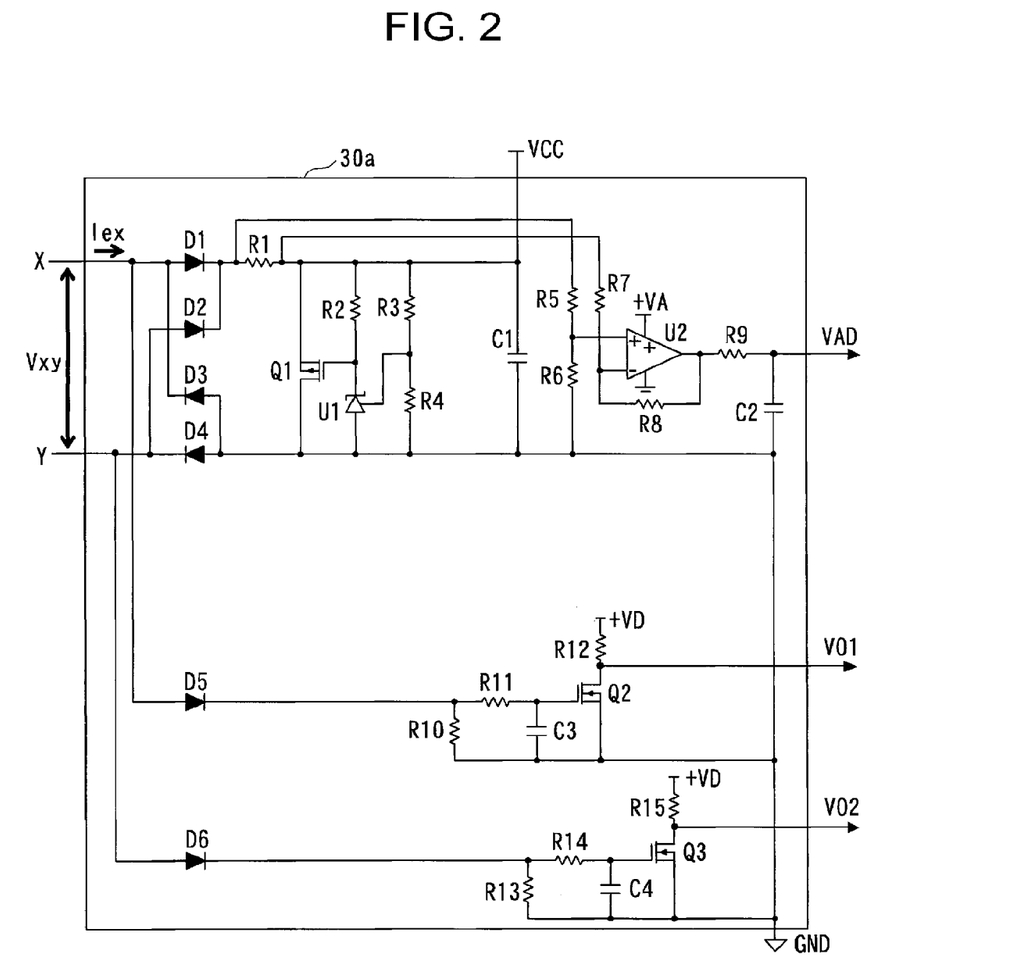
FIG. 2 is a circuit diagram illustrating the configuration of an input circuit of the calibrator according to the embodiment of the present invention.

FIG. 2 is a circuit diagram illustrating the configuration of the input circuit 30a according to this embodiment. The input circuit 30a includes a diode D1 having an anode connected to an input terminal X of the input circuit 30a; a diode D2 having an anode connected to an input terminal Y of the input circuit 30a and a cathode connected to a cathode of the diode D1; a diode D3 having a cathode connected to the input terminal X and an anode connected to ground; a diode D4 having a cathode connected to the input terminal Y and an anode connected to ground; a diode D5 having an anode connected to the input terminal X; a diode D6 having an anode connected to the input terminal Y; a resistor R1 having an end connected to the cathodes of the diodes D1 and D2 and another end connected to a power supply voltage output terminal of the input circuit 30a; resistors R2 and R3, each having an end connected to the power supply voltage output terminal; a resistor R4 having an end connected to the other end of the resistor R3 and another end connected to ground; a shunt regulator U1 having a reference input terminal connected to a node of the resistors R3 and R4, an anode connected to ground, and a cathode connected to the other end of the resistor R2; a p-channel power MOS transistor Q1 having a gate connected to the other end of the resistor R2 and the cathode of the shunt regulator U1, a source connected to the power supply voltage output terminal, and a drain connected to ground; a resistor R5 having an end connected to the cathodes of the diodes D1 and D2; a resistor R6 having an end connected to the other end of the resistor R5 and another end connected to ground; a resistor R7 having an end connected to the power supply voltage output terminal; an operational amplifier U2 having a power supply input terminal supplied with a power supply voltage (+VA), a noninverting input terminal connected to a node of the resistors R5 and R6, and an inverting input terminal connected to the other end of the resistor R7; a resistor R8 having an end connected to the inverting input terminal of the operational amplifier U2, and another end connected to an output terminal of the operational amplifier U2; a resistor R9 having an end connected to the output terminal of the operational amplifier U2 and another end connected to a first signal output terminal of the input circuit 30a; a resistor R10 having an end connected to a cathode of the diode D5 and another end connected to ground; a resistor R11 having an end connected to the cathode of the diode D5; an n-channel power MOS transistor Q2 having a gate connected to the other end of the resistor R11, a drain connected to a second signal output terminal of the input circuit 30a, and a source connected to ground; a resistor R12 having an end connected to a power supply voltage (+VD) and another end connected to the drain of the n-channel power MOS transistor Q2; a resistor R13 having an end connected to a cathode of the diode D6 and another end connected to ground; a resistor R14 having an end connected to the cathode of the diode D6; an n-channel power MOS transistor Q3 having a gate connected to the other end of the resistor R14, a drain connected to a third signal output terminal of the input circuit 30a, and a source connected to ground; a resistor R15 having an end connected to the power supply voltage (+VD) and another end connected to the drain of the n-channel power MOS transistor Q3; a capacitor C1 having an end connected to the power supply voltage output terminal and another end connected to ground; a capacitor C2 having an end connected to the other end of the resistor R9 and another end connected to ground; a capacitor C3 having an end connected to the other end of the resistor R11 and another end connected to ground; and a capacitor C4 having an end connected to the other end of the resistor R14 and another end connected to ground.

Figure 3:
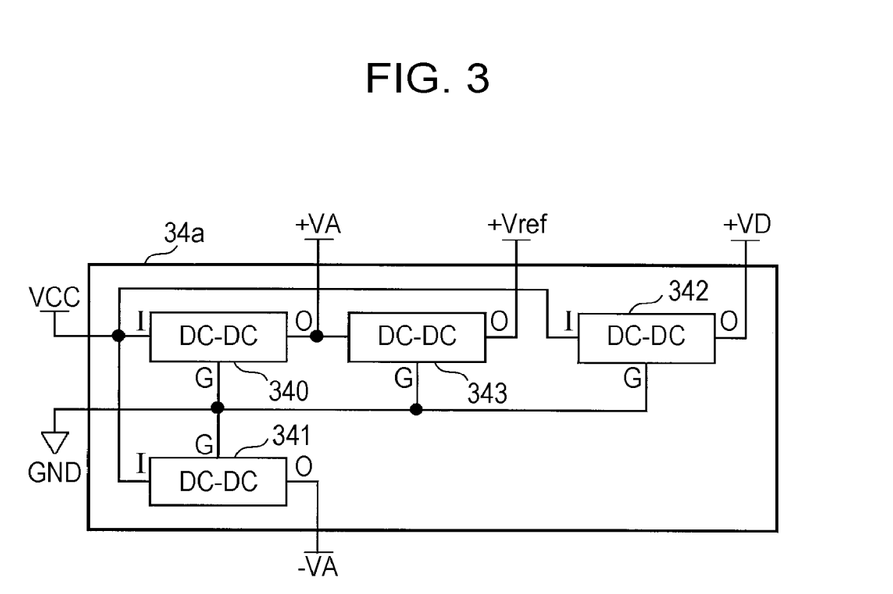
FIG. 3 is a block diagram illustrating the configuration of a power supply circuit of the calibrator according to the embodiment of the present invention.

FIG. 3 is a block diagram illustrating the configuration of the power supply circuit 34a according to this embodiment. The power supply circuit 34a includes a direct current to direct current (DC-DC) converter 340 that generates a DC power supply voltage (+VA), a DC-DC converter 341 that generates a DC power supply voltage (−VA), a DC-DC converter 342 that generates a DC power supply voltage (+VD), and a DC-DC converter 343 that generates a DC power supply voltage (+Vref).

In the input circuit 30a, the diodes D1 to D4, the operational amplifier U2, the resistors R1 and R5 to R9, and the capacitor C2 constitute a current value measurement input circuit. In the current value measurement input circuit, a single-phase full-wave rectifier circuit including the diodes D1 to D4 rectifies an alternating-current (AC) excitation current Iex, and the rectified current is converted into a voltage by the resistor R1 between an output terminal (the cathodes of the diodes D1 and D2) of the single-phase full-wave rectifier circuit and the power supply voltage output terminal. The resistance of the resistor R1 is set low (for example, 1Ω) to prevent heat generation. Since the resistance of the resistor R1 is reduced, the voltage level is also reduced accordingly. Thus, the voltage across the resistor R1 is amplified to a level by a differential amplifier circuit including the operational amplifier U2 and the resistors R5 to R8 so that the resolution necessary for the downstream A/D converters can be obtained.

In the way described above, the current value measurement input circuit converts the excitation current Iex input from the converter 2 into a voltage and inputs an output voltage VAD (a voltage for the measurement of a current value) obtained as a result of the conversion to an A/D converter ("A/D 1") of the CPU 31a. The output voltage VAD, which is proportional to the magnitude of the excitation current Iex and is accurate, is output. This enables the CPU 31a to accurately measure the excitation current value.

In the input circuit 30a, the diode D5, the n-channel power MOS transistor Q2, the resistors R10 to R12, and the capacitor C3 constitute a positive-polarity-detection input circuit. In the positive-polarity-detection input circuit, a single-phase half-wave rectifier circuit including the diode D5 rectifies only the positive-polarity portion of the AC excitation current Iex, and the rectified current is converted into a voltage by the resistor R10.

A low-pass filter circuit including the resistor R11 and the capacitor C3 performs low-pass filtering on the voltage across the resistor R10. The voltage that has passed through the low-pass filter circuit is converted into an output voltage VO1 of high level (+VD) or low level (0 V) by the n-channel power MOS transistor Q2. Specifically, the output voltage VO1 is at a low level when the excitation current Iex has positive polarity, whereas the output voltage VO1 is at a high level when the excitation current Iex has negative polarity.

In the way described above, the positive-polarity-detection input circuit converts the excitation current Iex into a voltage and inputs the resulting output voltage VO1, which is obtained as a result of the conversion, to an input port DI1 of the CPU 31a. In the CPU 31a, the output voltage VO1 is used only for the determination of the positive polarity of the excitation current Iex.

In the input circuit 30a, the diode D6, the n-channel power MOS transistor Q3, the resistors R13 to R15, and the capacitor C4 constitute a negative-polarity-detection input circuit. In the negative-polarity-detection input circuit, a single-phase half-wave rectifier circuit including the diode D6 rectifies only the negative-polarity portion of the AC excitation current Iex, and the rectified current is converted into a voltage by the resistor R13.

A low-pass filter circuit including the resistor R14 and the capacitor C4 performs low-pass filtering on the voltage across the resistor R13. The voltage that has passed through the low-pass filter circuit is converted into an output voltage VO2 of high level (+VD) or low level (0 V) by the n-channel power MOS transistor Q3. Specifically, the output voltage VO2 is at a low level when the excitation current Iex has negative polarity, whereas the output voltage VO2 is at a high level when the excitation current Iex has positive polarity.

In the way described above, the negative-polarity-detection input circuit converts the excitation current Iex into a voltage and inputs the resulting output voltage VO2, which is obtained as a result of the conversion, to an input port DI2 of the CPU 31a. In the CPU 31a, the output voltage VO2 is used only for the determination of the negative polarity of the excitation current Iex. The pull-down resistors R10 and R13 are assumed to have a high resistance (for example, 100 kΩ). This can make the excitation current Iex flowing not through the resistor R1 but through the resistor R10 or R13 negligible.

In the input circuit 30a, the shunt regulator U1, the p-channel power MOS transistor Q1, the resistors R2 to R4, and the capacitor C1 constitute a constant voltage circuit that generates a DC power supply voltage VCC from the excitation current Iex. In the constant voltage circuit, the voltage (power supply voltage VCC) that has passed through the resistor R1, which is used for excitation current detection, is divided by the voltage divider resistors R3 and R4, and the divided voltage is input to the reference input terminal of the shunt regulator U1.

The shunt regulator U1 controls the gate voltage of the p-channel power MOS transistor Q1 so as to make the voltage input to the reference input terminal equal to the internal reference voltage and consequently make the voltage VCC at the other end (power supply voltage output terminal) of the resistor R1 match a set voltage. This keeps the value of the power supply voltage VCC constant even when the value of the excitation current Iex input from the converter 2 varies. In addition, the capacitor C1, which is used for smoothing, is provided between the power supply voltage output terminal and ground. The power supply voltage VCC generated by the constant voltage circuit is supplied to the power supply circuit 34a via the switch SW1.

The DC-DC converter 340 of the power supply circuit 34a receives as input the power supply voltage VCC output from the power supply voltage output terminal of the input circuit 30a or the voltage fed from the battery 35, and generates a power supply voltage (+VA). The power supply voltage (+VA) is supplied to the input circuit 30a, the CPU 31a, and the output circuit 32. The DC-DC converter 341 of the power supply circuit 34a receives as input the power supply voltage VCC or the voltage fed from the battery 35, and generates a power supply voltage (−VA). The power supply voltage (−VA) is supplied to the output circuit 32. The DC-DC converter 342 of the power supply circuit 34a receives as input the power supply voltage VCC or the voltage fed from the battery 35, and generates a power supply voltage (+VD). The power supply voltage (+VD) is supplied to the input circuit 30a, the CPU 31a, and the setter/indicator 33. The DC-DC converter 343 of the power supply circuit 34a receives as input the power supply voltage (+VA), and generates a power supply voltage (+Vref).

The DC-DC converters 340 and 342 are step-up converters, the DC-DC converter 341 is a reverse-polarity converter, and the DC-DC converter 343 is a step-down converter. The power supply voltage has a relation of |VA|>VD>VCC.

Figure 4:
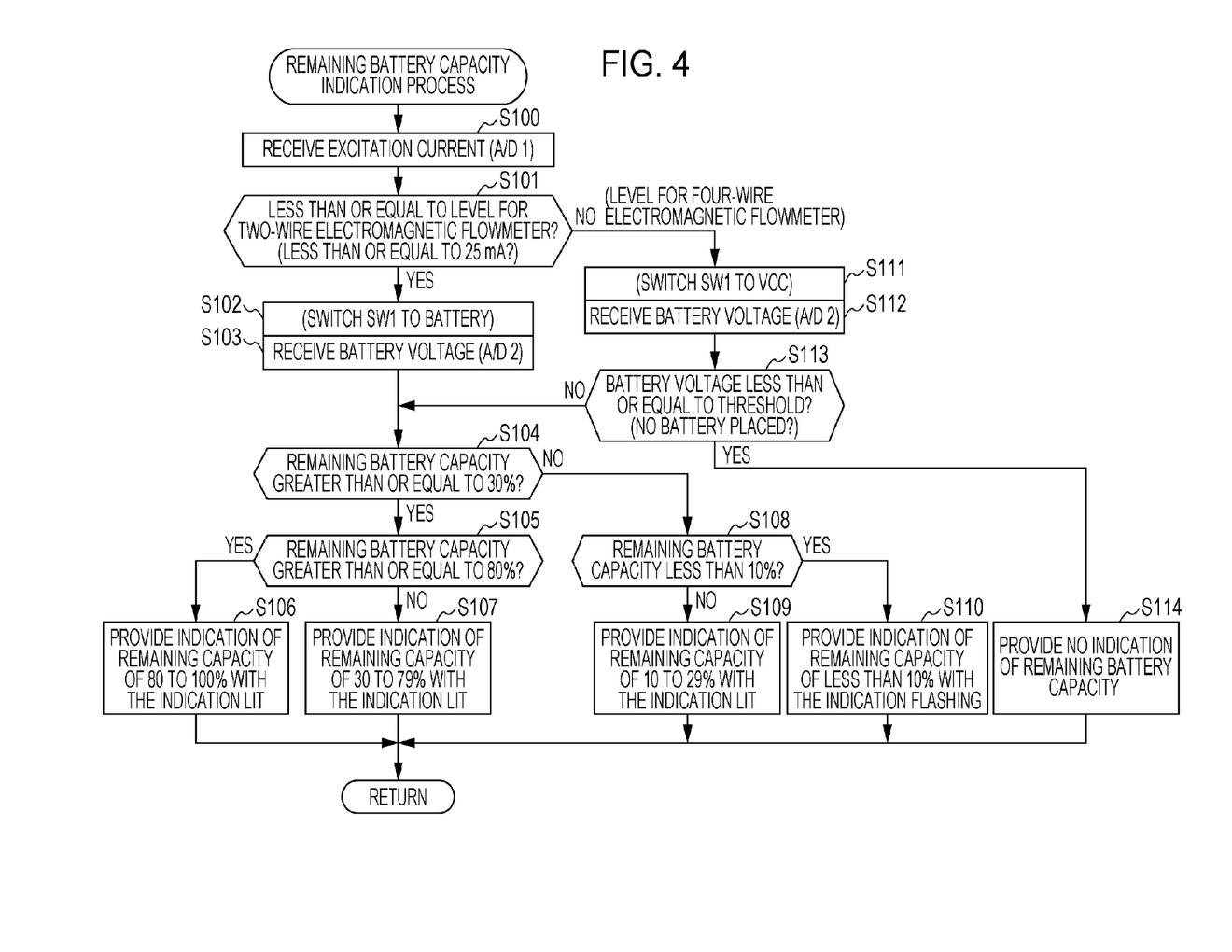
FIG. 4 is a flowchart illustrating a power supply voltage source switching process and a remaining battery capacity indication process by the calibrator according to the embodiment of the present invention.

Next, a power supply voltage source switching process and a remaining battery capacity indication process by the CPU 31a of the calibrator 3a according to this embodiment will be described. The CPU 31a executes the following process in accordance with a program stored in a memory (not illustrated) located in or outside the CPU 31a.

The CPU 31a receives the output voltage VAD output to the first signal output terminal of the input circuit 30a through an A/D converter ("A/D 1") (step S100 in FIG. 4). The CPU 31a determines the level of the output voltage VAD received through the A/D converter ("A/D 1") (step S101 in FIG. 4).

If the output voltage VAD falls within a range for a converter of a two-wire electromagnetic flowmeter (YES in step S101 in FIG. 4), the CPU 31a determines that the converter 2 connected to the calibrator 3a is a converter of a two-wire electromagnetic flowmeter. The determination of "YES" in step S101 indicates that the value of the excitation current Iex indicated by the output voltage VAD falls within a range of the excitation current Iex (for example, less than or equal to 25 mA) output from the converter 2, which is a converter of a two-wire electromagnetic flowmeter.

If the converter 2 connected to the calibrator 3a is a converter of a two-wire electromagnetic flowmeter, the CPU 31a controls the switch SW1 to switch the source of the power supply voltage to be supplied to the power supply circuit 34a to the battery 35 (step S102 in FIG. 4). Then, the CPU 31a receives the voltage of the battery 35 through an A/D converter ("A/D 2") (step S103 in FIG. 4). Specifically, in this voltage measurement, the voltage between the electrodes of the battery holder may be received through the A/D converter ("A/D 2").

The CPU 31a determines, based on a measurement result in step S103, whether the battery 35 has a remaining capacity RB greater than or equal to 30% (step S104 in FIG. 4). If the remaining capacity RB is greater than or equal to 30% (YES in step S104), the CPU 31a determines whether the remaining capacity RB of the battery 35 is greater than or equal to 80% (step S105 in FIG. 4).

The remaining capacity RB of the battery 35 is hereinafter also referred to as "remaining battery capacity RB" and is set for a range of power supply voltage that enables the calibrator 3a to operate. Letting, for example, the voltage of the battery 35, which is measured in step S103, be V, the nominal voltage of the battery 35 be $V_{nominal}$ (for example, 3 V), and the lower limit of the power supply voltage that enables the calibrator 3a to operate be $V_{minimum}$ for example, 2 V), the remaining battery capacity RB in percent (%) can be calculated by the following equation:

$$RB=(V-V_{minimum})/(V_{nominal}-V_{minimum})\times 100[\%]. \quad (1)$$

If the remaining battery capacity RB is greater than or equal to 80% (YES in step S105), the CPU 31a causes the setter/indicator 33 to provide a remaining capacity indication indicating that the remaining battery capacity RB is 80 to 100% (FIG. 9A) (step S106 in FIG. 4).

If the remaining battery capacity RB is less than 80% (NO in step S105), the CPU 31a causes the setter/indicator 33 to provide a remaining capacity indication indicating that the remaining battery capacity RB is 30 to 79% (FIG. 9B) (step S107 in FIG. 4). If the remaining battery capacity RB is less than 30% (NO in step S104), the CPU 31a determines whether the remaining battery capacity RB is less than 10% (step S108 in FIG. 4).

If the remaining battery capacity RB is not less than 10% (NO in step S108), the CPU 31a causes the setter/indicator 33 to provide a remaining capacity indication indicating that the remaining battery capacity RB is 10 to 29% (FIG. 9C) (step S109 in FIG. 4). If the remaining battery capacity RB is less than 10% (YES in step S108), the CPU 31a causes the setter/indicator 33 to provide a remaining capacity indication indicating that the remaining battery capacity RB is less than 10% (FIG. 9D) in such a manner that the indication is flashing at intervals of, for example, one second (step S110 in FIG. 4). The process of steps S103 to S110 described above is similar to that of the related art.

If the output voltage VAD falls within a range for a converter of a four-wire electromagnetic flowmeter but does not fall within the range for a converter of a two-wire electromagnetic flowmeter (NO in step S101), the CPU 31a determines that the converter 2 connected to the calibrator 3a is a converter of a four-wire electromagnetic flowmeter. The determination of "NO" in step S101 indicates that the value of the excitation current Iex indicated by the output voltage VAD falls within a range of the excitation current Iex (for example, a value greater than 25 mA) output from the converter 2, which is a converter of a four-wire electromagnetic flowmeter.

If the converter 2 connected to the calibrator 3a is a converter of a four-wire electromagnetic flowmeter, the CPU 31a controls the switch SW1 to switch the power supply voltage source so that the power supply voltage VCC output from the input circuit 30a can be supplied to the power supply circuit 34a (step S111 in FIG. 4). Then, the CPU 31a receives the voltage of the battery 35 through the A/D converter ("A/D 2") (step S112 in FIG. 4) in a way similar to that in step S103.

The CPU 31a determines whether the voltage measured in step S112 is less than or equal to a predetermined threshold TH1 (for example, 0.3 V) (step S113 in FIG. 4). If the measured voltage exceeds the threshold TH1 (NO in step S113), the CPU 31a determines that the battery 35 is in the battery holder and then the process proceeds to step S104. The operation in this case is performed in the way described above.

If the voltage measured in step S112 is less than or equal to the threshold TH1 (YES in step S113), the CPU 31a determines that the battery 35 is not in the battery holder, and stops providing a remaining battery capacity indication (step S114 in FIG. 4). The threshold TH1 may be set to a voltage value so low as to be unlikely to occur while the battery 35 is in the battery holder.

The CPU 31a performs the process illustrated in FIG. 4 described above every certain time period.

Next, a flow rate signal output process will be described with reference to a flowchart illustrated in FIG. 5. First, the CPU 31a receives the output voltage VAD from the input circuit 30a through an A/D converter ("A/D 1") (step S200 in FIG. 5). Then, the CPU 31a determines the level of the output voltage VAD received through the A/D converter ("A/D 1") (step S201 in FIG. 5). If the output voltage VAD is higher than a predetermined non-operating level, the CPU 31a determines the level of the output voltage VO1, which is received through the input port DI1 (step S202 in FIG. 5).

Figure 5:
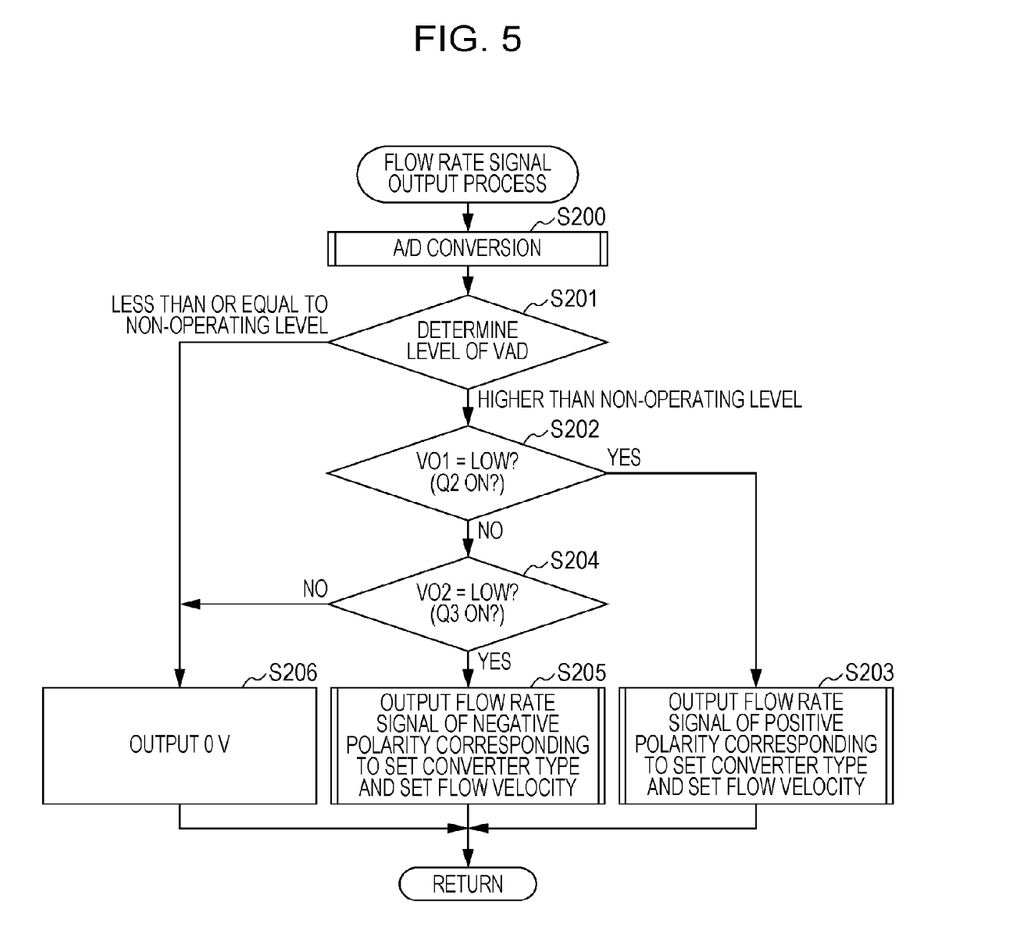
FIG. 5 is a flowchart illustrating a flow rate signal output process by the calibrator according to the embodiment of the present invention.

If the output voltage VO1 is at a low level (if the excitation current Iex output from the converter 2 has positive polarity), the CPU 31a outputs a reference flow rate signal of positive polarity corresponding to the type of the converter 2, which is determined in the determination process in step S101 in FIG. 4, and a preset flow velocity value (step S203 in FIG. 5). The reference flow rate signal is input to the converter 2 via a digital-to-analog (D/A) converter of the CPU 31a and the output circuit 32.

If the output voltage VO1 is not at a low level but at a high level, the CPU 31a determines the level of the output voltage VO2 received through the input port DI2 (step S204 in FIG. 5). If the output voltage VO2 is at a low level (if the excitation current Iex output from the converter 2 has negative polarity), the CPU 31a outputs a reference flow rate signal of negative polarity corresponding to the type of the converter 2, which is determined in the determination process in step S101, and a preset flow velocity value (step S205 in FIG. 5).

Note that, if the converter 2 connected to the calibrator 3a is a converter of a two-wire electromagnetic flowmeter, it is desirable to change the reference flow rate signal in accordance with the value of the excitation current Iex even when the same flow velocity value is set. Accordingly, if the converter 2 connected to the calibrator 3a is a converter of a two-wire electromagnetic flowmeter and the excitation current Iex output from the converter 2 has positive polarity, the CPU 31a outputs a reference flow rate signal of positive polarity corresponding to the type of the converter 2, which is determined in the determination process in step S101, the value of the excitation current Iex indicated by the output voltage VAD, and a preset flow velocity value (step S203). If the excitation current Iex output from the converter 2 has negative polarity, the CPU 31a outputs a reference flow rate signal of negative polarity corresponding to the type of the converter 2, which is determined in the determination process in step S101, the value of the excitation current Iex indicated by the output voltage VAD, and a preset flow velocity value (step S205).

If the output voltage VO2 is not at a low level but at a high level, the CPU 31a sets the reference flow rate signal to a 0-V signal (step S206 in FIG. 5). The CPU 31a also sets the reference flow rate signal to a 0-V signal (step S206) when the output voltage VAD is less than or equal to the non-operating level. The CPU 31a performs the flow rate signal output process described above in synchronization with the excitation current Iex from the converter 2 (the output voltages VAD, VO1, and VO2 input from the input circuit 30a).

In this embodiment, therefore, when the converter 2 connected to the calibrator 3a is a converter of a four-wire electromagnetic flowmeter, the input circuit 30a generates the power supply voltage VCC by using the excitation current Iex supplied from the converter 2, thereby enabling the calibrator 3a to be driven without a battery. When the converter 2 is a converter of a two-wire electromagnetic flowmeter, the power supply voltage source is switched from the input circuit 30a to the battery 35, thereby preventing shortage of power necessary for the calibrator 3a to operate.

In this embodiment, furthermore, when the converter 2 connected to the calibrator 3a is a converter of a four-wire electromagnetic flowmeter and the voltage of the battery 35 exceeds the threshold TH1, a remaining battery capacity indication similar to that for a converter of a two-wire electromagnetic flowmeter is given, whereas when the converter 2 is a converter of a four-wire electromagnetic flowmeter and the voltage of the battery 35 is less than or equal to the threshold TH1, the indication of the remaining battery capacity is stopped.

Figure 6A:
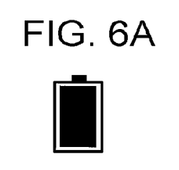
FIGS. 6A to 6E are diagrams illustrating example remaining battery capacity indications when a converter connected to the calibrator according to the embodiment of the present invention is a converter of a four-wire electromagnetic flowmeter.
Figure 6B:
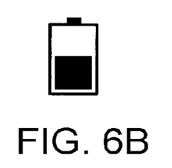
Figure 6C:
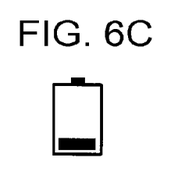
Figure 6D:
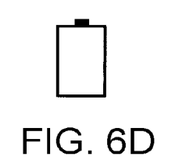
Figure 6E:
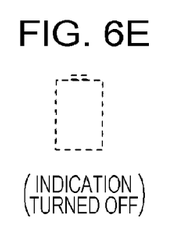

FIGS. 6A to 6D illustrate example remaining battery capacity indications provided by the setter/indicator 33 when the converter 2 is a converter of a four-wire electromagnetic flowmeter. The remaining battery capacity indications provided when the converter 2 is a converter of a two-wire electromagnetic flowmeter are as illustrated in FIGS. 9A to 9D. When the converter 2 is a converter of a four-wire electromagnetic flowmeter, the remaining capacity indication is provided using four stages: a remaining battery capacity RB of 80 to 100% (FIG. 6A), a remaining to 79% (FIG. 6B), a remaining battery capacity RB of 10 to 29% (FIG. 6C), and a remaining battery capacity RB of 1 to 9% (FIG. 6D). When the converter 2 is a converter of a four-wire electromagnetic flowmeter and the battery 35 is not in the battery holder, as illustrated in FIG. 6E, the indication of the remaining battery capacity is stopped.

In this embodiment, therefore, no remaining battery capacity indication is given (i.e., no remaining battery capacity alarm is given) when the converter 2 connected to the calibrator 3*a* is a converter of a four-wire electromagnetic flowmeter and the calibrator 3*a* is in operation without using the battery 35. This configuration allows no remaining battery capacity alarm to be given to a user who uses only a four-wire electromagnetic flowmeter, which results in the user being unnecessarily bothered. In addition, when the converter 2 is a converter of a two-wire electromagnetic flowmeter and the remaining battery capacity is less than 1%, the calibrator 3*a* is not activated due to insufficient voltage (i.e., all indication is turned off) and thus the mode corresponding to step S114 is not entered.

When the converter 2 is a converter of a four-wire electromagnetic flowmeter and the remaining capacity RB of the battery 35 is less than 10% (YES in step S108), the indication of the remaining battery capacity may be flashing (step S110), as in the case where the converter 2 is a converter of a two-wire electromagnetic flowmeter, or may not be flashing but only an indication illustrated in FIG. 6D may be given. A flashing indication of the remaining battery capacity may alert a user to remove the battery 35, preventing accidents such as battery leakage due to over-discharging of the battery 35.

In this embodiment, furthermore, the power supply voltage source switching unit includes, but is not limited to, the CPU 31*a* and the switch SW1. Alternatively, the power supply voltage source switching unit may include the switch SW1 and a comparator circuit in the input circuit 30*a*. In this case, the comparator circuit may control the switch SW1 to switch the power supply voltage source so that the power supply voltage VCC output from the input circuit 30*a* can be supplied to the power supply circuit 34*a* when the output voltage VAD output to the first signal output terminal of the input circuit 30*a* is greater than or equal to a predetermined voltage threshold TH2, and may control the switch SW1 to switch the source of the power supply voltage to be supplied to the power supply circuit 34*a* to the battery 35 when the output voltage VAD is less than the voltage threshold TH2.

The voltage threshold TH2 may be set to a voltage value corresponding to a current value (for example, 27 mA) slightly larger than the excitation current Iex (less than or equal to approximately 25 mA) supplied from the converter 2 when the converter 2 connected to the calibrator 3*a* is a converter of a two-wire electromagnetic flowmeter. This setting allows the output voltage VAD to be greater than or equal to the voltage threshold TH2 when the converter 2 connected to the calibrator 3*a* is a converter of a four-wire electromagnetic flowmeter, because the excitation current Iex is large, and allows the output voltage VAD to be less than the voltage threshold TH2 when the converter 2 is a converter of a two-wire electromagnetic flowmeter, because the excitation current Iex is small.

The present invention is applicable to a technique for calibrating a converter of an electromagnetic flowmeter.

What is claimed is:

1. A standard signal generator for generating a reference flow rate signal for calibrating an electromagnetic flowmeter, comprising:
   an input circuit configured to receive an excitation current obtained from a converter in the electromagnetic flowmeter;
   a battery holder to hold a battery;
   a power supply voltage source switching unit configured to switch a source of a power supply voltage to be used in the standard signal generator; and
   a remaining capacity indicator configured to provide a remaining battery capacity indication,
   wherein the input circuit includes
      a rectifier circuit configured to rectify the excitation current obtained from the converter, and
      a constant voltage circuit configured to receive as input an output voltage of the rectifier circuit and control a power supply voltage output from a power supply voltage output terminal of the input circuit so that the power supply voltage is maintained constant,
   wherein the power supply voltage source switching unit is further configured to switch the source of the power supply voltage to be used in the standard signal generator to the constant voltage circuit when the converter, which is connected to the standard signal generator, is a converter of a four-wire electromagnetic flowmeter, and switch the source of the power supply voltage to be used in the standard signal generator to a battery placed in the battery holder when the converter, which is connected to the standard signal generator, is a converter of a two-wire electromagnetic flowmeter,
   wherein the remaining capacity indicator is further configured to measure a voltage of the battery across electrodes of the battery holder, and provide a remaining battery capacity indication based on a measurement result obtained by measuring the voltage of the battery, and
   wherein when the converter, which is connected to the standard signal generator, is a converter of a four-wire electromagnetic flowmeter and it is determined, based on the measurement result, that the battery is not in the battery holder, the remaining capacity indicator is configured to stop providing a remaining battery capacity indication.

2. The standard signal generator according to claim 1, wherein when the converter, which is connected to the standard signal generator, is a converter of a four-wire electromagnetic flowmeter or a two-wire electromagnetic flowmeter and it is determined, based on the measurement result, that the battery placed in the battery holder has a remaining capacity less than a specified value, the remaining capacity indicator is configured to give a remaining battery capacity alarm.

3. The standard signal generator according to claim 1, wherein the input circuit further includes a current value measurement input circuit configured to output a current-value-measurement voltage for measurement of a current value, the current-value-measurement voltage being proportional to a magnitude of the excitation current obtained from the converter, and wherein the power supply voltage source switching unit and the remaining capacity indicator are configured to determine, based on the current-value-measurement voltage, whether the converter, which is connected to the standard signal generator, is a converter of a four-wire electromagnetic flowmeter or a converter of a two-wire electromagnetic flowmeter.

4. The standard signal generator according to claim 1, further comprising a controller configured to generate a reference flow rate signal synchronized with the excitation current obtained from the converter and output the reference flow rate signal to the converter.

\* \* \* \* \*